(12) United States Patent
Mackie et al.

(10) Patent No.: US 10,692,070 B2
(45) Date of Patent: Jun. 23, 2020

(54) EXTENDED DATA STORAGE

(71) Applicant: Visa Europe Limited, London (GB)

(72) Inventors: Nicolas David Mackie, London (GB); Stuart Fiske, London (GB)

(73) Assignee: Visa Europe Limited, London (GB)

( * ) Notice: Subject to any disclaimer, the term of this patent is extended or adjusted under 35 U.S.C. 154(b) by 3 days.

(21) Appl. No.: 16/091,498

(22) PCT Filed: May 11, 2017

(86) PCT No.: PCT/EP2017/061376
§ 371 (c)(1),
(2) Date: Oct. 4, 2018

(87) PCT Pub. No.: WO2017/194695
PCT Pub. Date: Nov. 16, 2017

(65) Prior Publication Data
US 2019/0122204 A1    Apr. 25, 2019

(30) Foreign Application Priority Data

May 13, 2016 (GB) .................................. 1608444.4

(51) Int. Cl.
*G06Q 20/34* (2012.01)
(52) U.S. Cl.
CPC ......... *G06Q 20/352* (2013.01); *G06Q 20/341* (2013.01); *G06Q 20/354* (2013.01); *G06Q 20/3552* (2013.01); *G06Q 20/3563* (2013.01)
(58) Field of Classification Search
CPC .............. G06Q 20/341; G06Q 20/352; G06Q 20/3552; G06Q 20/3563
(Continued)

(56) References Cited

U.S. PATENT DOCUMENTS 6,402,028 B1    6/2002  Graham, Jr. et al.
2004/0065734 A1*  4/2004  Piikivi ................... G05B 19/00
                                         235/451
(Continued)

FOREIGN PATENT DOCUMENTS

WO    2001178020 A1    10/2001
WO    2010022129 A     2/2010

OTHER PUBLICATIONS

European Search Report, dated Nov. 21, 2017, in GB Application No. 1608444.4, pages.
(Continued)

*Primary Examiner* — Toan C Ly
(74) *Attorney, Agent, or Firm* — Kilpatrick Townsend & Stockton LLP

(57) ABSTRACT

Methods and apparatus are provided for configuring a contactless application on a chip within a portable device comprising input/output means arranged to communicate with other devices via a contact connection and via a contactless connection. One such method comprises a first process and a second process. The first process comprises receiving, at the chip and from a first other device, a set of computer instructions, to be executed by the chip, to create a contactless application in a data store of the chip and initialise at least one file associated with the contactless application. The first process further comprises configuring the contactless application in accordance with the set of computer instructions. The second process comprises executing, by the chip of the portable device, the contactless application, whereby to transmit data to a second other device. The first process is conducted via physical contact between the first other device and the portable device and the second process is conducted via contactless communication
(Continued)

between the portable device and a contactless reader of the second other device.

11 Claims, 5 Drawing Sheets

(58) Field of Classification Search
USPC .......................................................... 235/380
See application file for complete search history.

(56) References Cited

U.S. PATENT DOCUMENTS

| | | |
|---|---|---|
| 2005/0109841 A1 | 5/2005 | Ryan et al. |
| 2009/0065571 A1 | 3/2009 | Jain |
| 2011/0035604 A1 | 2/2011 | Habraken |
| 2014/0052630 A1 | 2/2014 | Bona et al. |

OTHER PUBLICATIONS

Examination Report dated Mar. 19, 2020 for EP Patent Application No. 17726211.0, 7 pages.

* cited by examiner

US 10,692,070 B2

EXTENDED DATA STORAGE

CROSS-REFERENCES TO RELATED APPLICATIONS

This application is a National Stage of International Application No. PCT/EP2017/061376 filed May 11, 2017, and which claims the benefit of Great Britain Patent Application No. 1608444.4 filed May 13, 2016, of which are all herein incorporated by reference.

TECHNICAL FIELD

The present disclosure relates to methods, systems and computer programs for configuring and using a contactless application via contact and contactless interactions.

BACKGROUND

Transactions are frequently conducted using portable devices, for example payment cards. Such portable devices are often capable of interacting via both contact and contactless connections. An example of a contact interaction is a "chip and PIN" interaction according to the EMV (Europay, MasterCard, Visa) standard, which describes smart cards which store and process data in integrated circuits. In a "chip and PIN" interaction, the card is inserted into a reader, for example in a point of sale terminal, which reads card data via contacts on the surface of the card, and the user authenticates their identity by providing a PIN. In a contactless interaction, data is transmitted from a chip of the card to a reader using short-range radio transmissions. An example of a chip for contactless interactions is a MIFARE chip, for example MIFARE DESFire, supplied by NXP Semiconductors.

The capacity for contact and contactless transactions may be combined in a single "dual application" card. These typically require contact transactions to be processed by one application on the card, and contactless transactions to be processed by a different application, with minimal intra-card communication between the two applications. An interaction requiring both applications would thus require the user to alternate between contact and contactless interactions.

SUMMARY

According to a first aspect of the present disclosure, there is provided a method for configuring a contactless application on a chip within a portable device. The portable device comprises input/output means arranged to communicate with other devices via a contact connection and via a contactless connection. The method comprises a first process and a second process.

The first process comprises:
receiving, at the chip and from a first other device, a set of computer instructions, to be executed by the chip, to:
create a contactless application in a data store of the chip; and
initialise at least one file associated with the contactless application,
configuring the contactless application in accordance with the set of computer instructions.

The second process comprises:
executing, by the chip of the portable device, the contactless application, whereby to transmit data to a second other device.

The first process is conducted via physical contact between the first other device and the portable device and the second process is conducted via contactless communication between the portable device and a contactless reader of the second other device.

In this manner, the method allows a contactless application to be dynamically configured via a contact interaction of the portable device with the first other device. This is significantly cheaper than pre-configuring portable devices with specific applications desired by a given user, and can be more efficiently scaled in response to increasing demand for portable devices.

Further features and advantages of the disclosure will become apparent from the following description of preferred embodiments, given by way of example only, which is made with reference to the accompanying drawings.

DETAILED DESCRIPTION

Figure 1A:
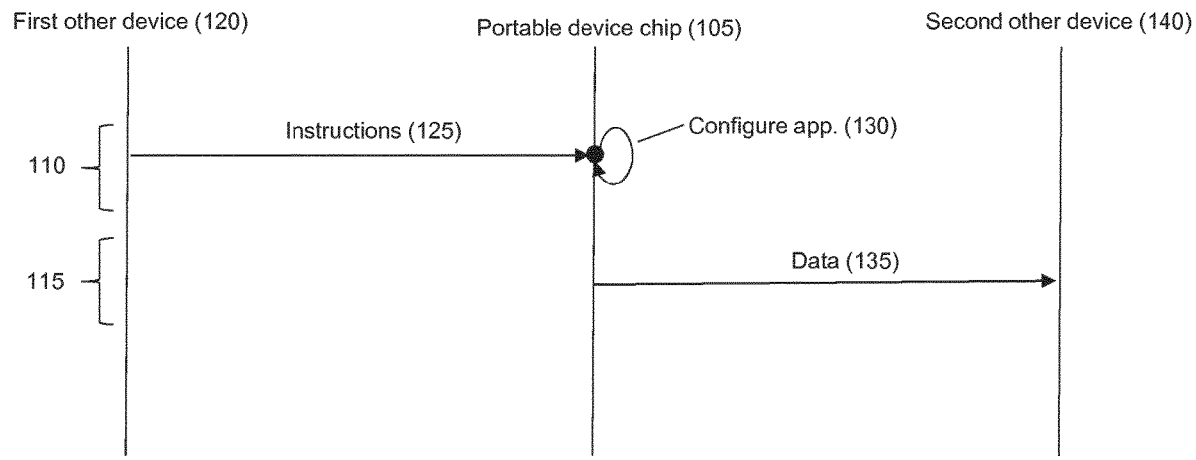
FIGS. 1A and 1B show schematic representations of system architectures according to embodiments of the present disclosure.

A system architecture according to embodiments of the present disclosure is shown in FIG. 1A, which depicts a method for configuring a contactless application on a chip 105 within a portable device according to an example. The portable device may for example be a payment card such as a smart card operating according to the EMV standard, or a computing device such as a mobile telephone, tablet or "dongle" configured to conduct contact and contactless interactions. The portable device comprises input/output means arranged to communicate with other devices via a contact connection and via a contactless connection. The method comprises executing a first process 110 and a second process 115.

The first process 110 comprises receiving, at the chip 105 and from a first other device 120, a set of computer instructions 125, to be executed by the chip 105. The first other device 120 may for example be a point of sale (PoS) terminal, an automated teller machine (ATM) or another computing device communicatively coupled with a device configured to interact with the chip 105 such as for example a card reader. The set of instructions 125 comprises instructions to create a contactless application in a data store of the chip and initialise at least one file associated with the contactless application. In some embodiments, the instructions 125 comprise instructions to initialise at least one cryptographic key associated with the application. At 130 the chip 105 executes the instructions and the contactless application is thus configured in accordance with the set of instructions, examples of which will be described in more detail below.

In some aspects of the present disclosure a first part of the instructions 125 is received and executed at a first time and a second part of the instructions 125 is received and executed at a second time later than the first time. The first part of the instructions 125 comprises instructions to perform at least one of the tasks of creating the contactless application, initialising the at least one file associated with the contactless application, and initialising the at least one cryptographic key associated with the contactless application. The second part of the instructions 125 comprises instructions to perform at least one of the previously-listed tasks not performed in response to the first part of the instructions 125.

The first and second parts of the instructions may be received from different other devices. For example, in one embodiment, the first part of the instructions 125 is received from a pre-configuration device and executed by the chip during pre-configuration of the portable device before the portable device is issued to a user. In this example, the first part of the instructions comprises instructions to create the contactless application but does not contain instructions to initialise files or cryptographic keys associated with the application. The second part of the instructions 125 may then be received from a first device as described above, for example an ATM or point of sale terminal, after the portable device is issued to the user. In this example, the second part of the instructions 125 comprises instructions to initialise the at least one file and the at least one cryptographic key associated with the application.

In other examples, the tasks of creating the application, initialising the at least one file and initialising the at least one cryptographic key are divided differently between the first and second parts of the instructions 125. For example, the first part may comprise instructions to create the application and initialise the at least one cryptographic key, and the second part may comprise instructions to initialise the at least one file.

The second process 115 comprises executing, by the chip 105 of the portable device, the contactless application, whereby to transmit data 135 to a second other device 140.

The first process 110 is conducted via physical contact between the first other device 120 and the portable device and the second process 115 is conducted via contactless communication between the portable device and a contactless reader of the second other device 140. Aspects of the present disclosure thus allow a contactless application to be configured via a contact interaction of the portable device with the first other device 120.

In some embodiments, the portable device may comprise a payment card such as a debit card or credit card, comprising an EMV application and configured to perform EMV contactless payment transactions by executing the EMV application. In such an example, the contactless application configured via the first process 110 may be configured to conduct a transaction other than an EMV payment transaction, and thus the second process 115 may comprise a transaction other than an EMV payment transaction, for example a transaction associated with a transit network such as accessing a transit network based on pre-paid credit or a season ticket.

In some such embodiments, the second process 115 is performed independently of the EMV application such that, during the second process, the payment card acts as a dedicated device for executing the contactless application. For example, where the contactless application is a DESFire application, the payment card acts as a dedicated DESFire card.

In other embodiments, the second process 115 is performed via the EMV application. In such an embodiment, the EMV application is configured to, during the second process 115, receive the data 135 from the contactless application and transmit corresponding data to the second other device 140. The EMV application may also be configured to, during the second process 115, receive data from the second other device 140 and communicate corresponding data to the contactless application. The data transmitted to and from the second other device 140 may comprise commands in a format associated with the contactless application. For example, where the contactless application is a DESFire application, the data transmitted to and from the second other device 140 may comprise DESFire commands. In such an example, although the data 135 is transmitted via the EMV application, the payment card appears to the second other device as a dedicated device for executing the contactless application.

In one embodiment, the contactless application is a contactless payment application such as a transit application for allowing access to a transit network. The second other device 140 may then comprise a turnstile or other access control device of the transit network. In such an embodiment, the transit application may allow for storage of pre-paid credit and/or season tickets for redeeming against journeys within the transit network.

In some embodiments, the first process 110 comprises receiving the computer instructions 125, which may be embodied as compressed data, and, if necessary decompressing the compressed data to obtain the set of computer instructions 125. For example, depending on the technology used for contact interactions, a maximum size may be imposed on contact transmissions to the chip 105. If this maximum size is smaller than the size of instructions 125 typically used to configure 130 a contactless application, the instructions 125 may be compressed in order to allow them to be transmitted in a single transmission. The chip 105 then decompresses the instructions 125 into a format suitable for configuring 130 the application in the data store, for example a format readable by the data store. Data may be compressed using any or a combination of methods. For example, as described in more detail below, some data associated with the application, such as initialisation of files associated with the application, may not be strictly required and may thus be omitted. As another example, uncompressed instructions may comprise repeated series of the same binary value. Such repeated series may be encoded using known run-length encoding algorithms.

In some embodiments, the chip 105 is preconfigured with a template. The chip 105 uses the template for interpreting the received computer instructions 125 and generating commands readable by the data store. For example, where the data store comprises a DESFire chip, the chip 105 uses the template to generate commands, for configuring the application in the data store in accordance with the set of instructions 125, in a format readable by the DESFire chip. The template may for example be an XML template.

In one such embodiment, the template receives the computer instructions 125 within, for example, a script. In one arrangement, the chip 105 is configured with a template comprising the computer instructions 125, for example as part of a configuration procedure before the portable device is issued to a user. Alternatively, the configuring may take place after the portable device is issued to the user; for example the template may be sent to the portable device within a script. As such, during the configuration procedure, the instructions 125 are received and stored on the portable device. In this example, the computer instructions 125 are then executed in response to a single command received at the chip 105. The single command may for example be received via a contact or contactless interaction of the portable device with a terminal such as a point of sale terminal or ATM. This allows the contactless application to, from the perspective of the user, be created in response to the single command.

In one example wherein a first part of the instructions 125 is received and executed at a first time and a second part of the instructions 125 is received and executed at a second time, as described above, the second part of the instructions 125 comprises a command to activate the contactless application. Executing the second part of the instructions thus comprises activating the contactless application. The second part of the instructions 125 is received at the chip 105 from another device, which may for example be the first other device 120 or a third other device. The second part of the instructions 125 may be received at the portable device chip 105 via physical contact between the other device and the portable device. For example, the first other device 120 may be a computing device for configuring the portable device chip 105 before the portable device is issued to the user. The third other device may then comprise a terminal, for example a point of sale terminal or ATM, which transmits the command following a request, for example from the user, to activate the contactless application. In such embodiments, following configuring of the contactless application, the contactless application is inactive until the second part of the instructions 125 is received and the command is executed. The contactless application may thus be activated in response to a received command. In one such embodiment, the application may not be activated until the user makes a payment associated with the application, for example relating to purchasing pre-paid credit or a token, such as a transit season ticket, associated with the application. The command may for example comprise a cryptographic key associated with the contactless application, and executing the second part of the instructions may comprise initialising the cryptographic key in the contactless application.

Figure 1B:
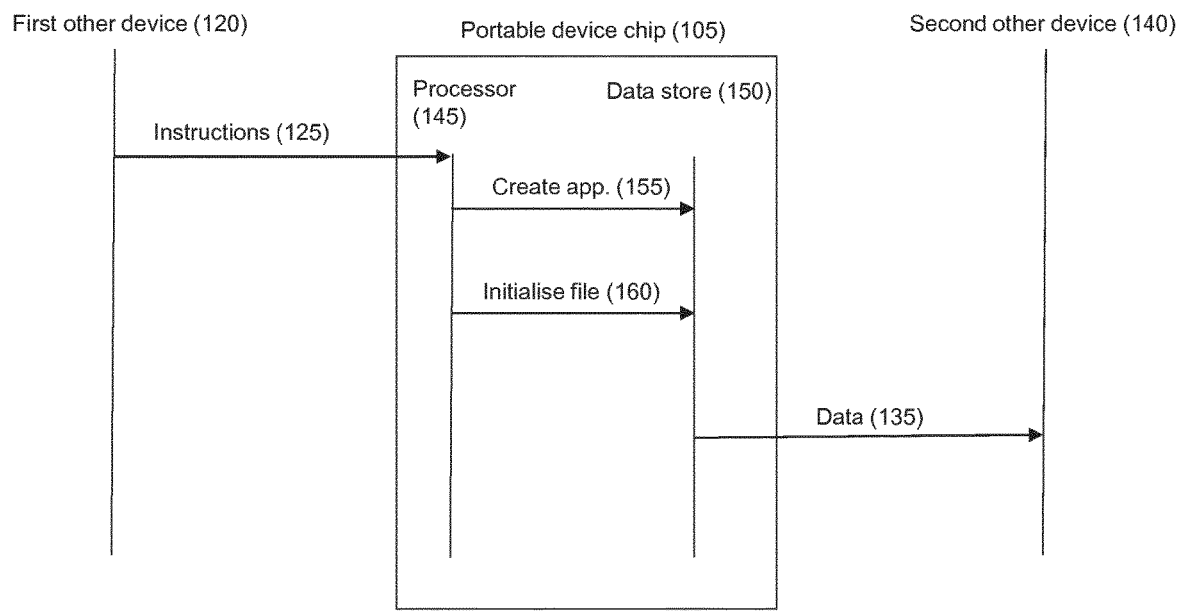

FIG. 1B shows a schematic representation of an architecture for implementing a method according to an aspect of the present disclosure. The architecture comprises a portable device chip 105, first other device 120 and second other device 120 operating for example as described above in relation to FIG. 1A. The portable device chip 105 comprises a processor 145 and a data store 150. The computer instructions 125 received from the first other device 120 comprise the instructions to create 155 the contactless application as described above. The instructions 125 further comprise the instructions to initialise 160 a file associated with the contactless application, as described above. For example, the instructions to initialise 160 the file may comprise instructions to create a file structure comprising the at least one file and store within the file structure data associated with the at least one file.

Figure 2:
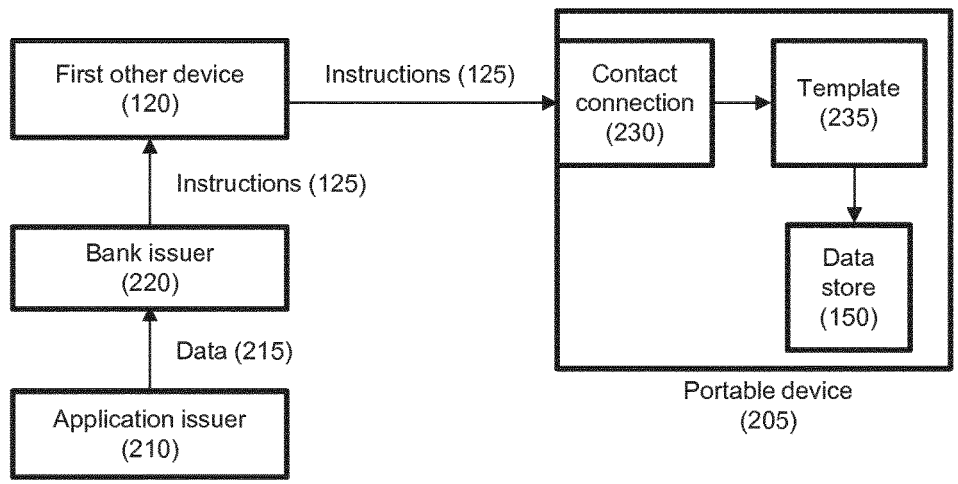
FIG. 2 shows a schematic representation of a series of steps for configuring a contactless application according to an example.

FIG. 2 shows a schematic representation of a series of steps for configuring a contactless application in a data store 150 of a portable device 205 according to an embodiment wherein the contactless application is issued by an application issuer 210 other than a bank issuer 220 associated with the portable device 205. In this embodiment, as described in more detail below, data 215 for configuring and activating the contactless application is provisioned by the application issuer 210 to the bank issuer 220; the bank issuer 220 then transmits instructions 125 as described above to the portable device 205, via the first other device 120. In this manner, the issuing bank 210 can provide for a third party without direct access to the data store 150 of the portable device 205, i.e. the application issuer 210, to configure a contactless application in the data store 150 of the portable device 205.

In this embodiment, an application issuer 210, for example a transit provider, transmits data 215 associated with the contactless application to a bank issuer 220. The bank issuer 220 may for example be an issuing bank associated with the portable device 205 according to the known four-party payment model. In some examples data 215 comprises cryptographic keys for activating contactless application and/or other data required for configuring and/or activating the contactless application. Data 215 may be sent from the application issuer 210 to the bank issuer 220 in response to a request from the user to the application issuer 210 to configure the application.

The bank issuer 220 transmits instructions 125, for configuring the application, to the first other device 120, which, as described above, may be an ATM or point of sale terminal. Instructions 125 may for example comprise a script. Instructions 125 may be transmitted in response to a request received at the bank issuer 220 from the first other device 120. For example, the request from the first other device 120 may comprise an authorisation request for configuring the application, and instructions 125 may comprise an authorisation response to the authorisation request. In some examples, the request is sent from the first other device 120 following a request from the user, input to the first other device 120, to configure the contactless application. For example, where the first other device 120 comprises a payment terminal associated with a transit network, the request from the user may comprise a request to configure an application for travel on that network. As regards the embodiment described in relation to third party application issuers, the user may, offline, request configuration of the application via a web interface of the application issuer 210. In this scenario, when a user next inserts their portable device 205 into e.g. a point of sale terminal, the bank issuer 220 recognises that this portable device 205 has been flagged for application configuration, and proceeds to configure the contactless application based on the data 215 previously received from the application issuer 210.

As described above, the first other device 120 transmits the instructions 125 to the portable device 205 via a contact connection 230 of the portable device 205. The first other device 120 may comprise the next compatible other device with which the portable device interacts, via the contact connection 230, following the above-mentioned request from the user to configure the application. For example, data 215 may be transmitted to the bank issuer 220 immediately following the request from the user. Instructions 125 may then be transmitted to the next ATM, POS terminal or other device with which the portable device 205 undergoes a contact interaction. This next ATM, POS terminal or other device thus comprises the first other device 120.

Other data may also be transmitted between the portable device 205 and the first other device 120. For example, the portable device 205 may transmit to the first other device 120 data corresponding to a payment associated with the application. Examples of such payments include payment for an amount of pre-paid credit associated with the application and/or payment for a token associated with the application, such as a transit season ticket.

As described above, a contactless application may be dynamically configured in response to a request from the user. Applications are thus not required to be pre-configured on the portable device, but may be configured when required. This allows mass production of standard portable devices with no applications configured, which can then be configured as required by their respective users. This is significantly cheaper than pre-configuring portable devices with the specific applications desired by a given user, and can be more efficiently scaled in response to increasing demand for portable devices.

The present disclosure also allows a single portable device to be configured with applications associated with different application issuers, with no communication being required between the application issuers. Users may thus carry a smaller number of portable devices whilst maintaining access to their desired applications. The present disclosure also allows future applications to be supported, for example associated with new application issuers, whilst not requiring users to receive new portable devices.

Figure 3:
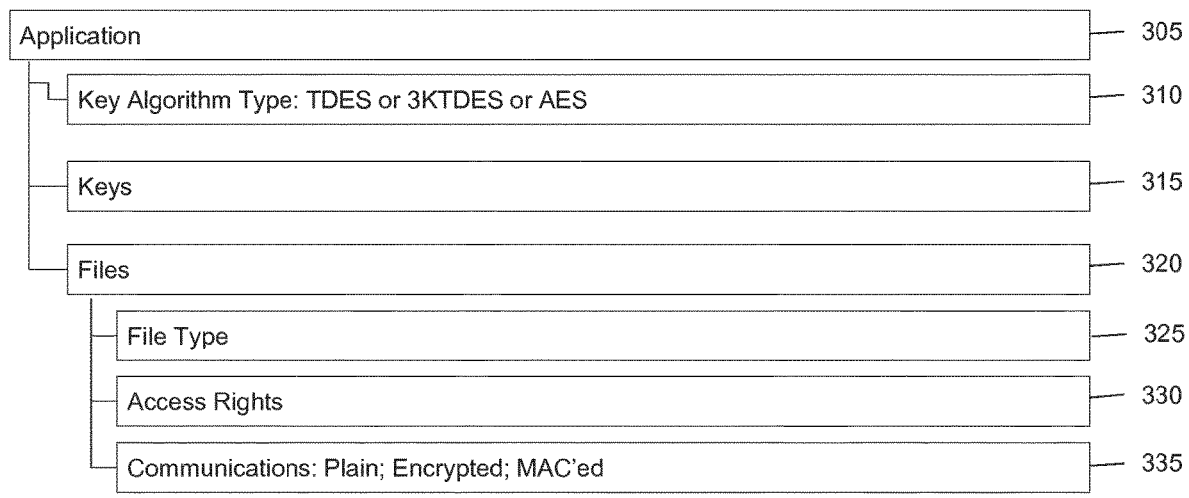
FIG. 3 shows an example structure of a contactless application.

FIG. 3 shows a structure of a contactless application 305 according to an example. In this example, which relates to a DESFire chip, up to 28 applications may be stored, each of which has a 3-byte ID. The application comprises a cryptographic key algorithm 310, for example TDES, 3KTDES or AES. The set of computer instructions 125 to create such an application comprises instructions to store at least one cryptographic key 315 associated with the application. For example, in a DESFire application, up to 14 keys may be stored comprising a master key and a number of file keys. The at least one key may be used for example to authenticate the portable device during a transaction.

The contactless application 305 comprises at least one file 320. For example, a DESFire application can comprise up to 32 different files, each of which has file type 325, access rights 330, communication types 335, among others. For example, a DESFire application supports file types of "standard", "backup", "value", "linear" and "cyclic". In some embodiments, only a subset of the available file types may be supported by a first application, which means that the instructions 125 for this first application can be commensurately smaller than those required for an application that supports all file types. For example, the "value" file type may not be supported.

Access rights 330 are associated with each file 320, for example associated with given classes of administrator and user. Examples of such access rights include "read", showing that the file 320 may be read, "write", showing that the file 320 may be written to, "read and write", showing that the file 320 may be read and written to, and "change access rights" showing that the access rights of the file 320 may be changed.

Communication protocol data 335 is associated with each file 320, defining communication protocols that must be used when transmitting data associated with that file 320. Example communication protocols include "plain", indicating that data may be transmitted as plaintext, "encrypted", indicating that data must be transmitted encrypted, and "message authentication code (MAC)", indicating that data must be authenticated by a message authentication code.

Figure 4:
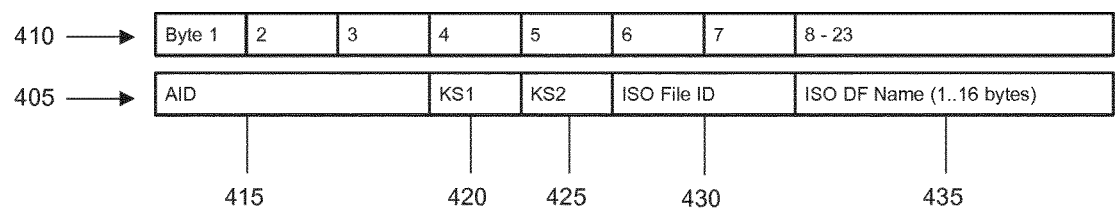
FIG. 4 shows a schematic representation of content of a computer instruction to create a contactless application according to an example.

FIG. 4 shows a schematic representation of content 405 of a computer instruction to create a contactless application according to an example. A counter 410 of the bytes comprising each element of the content 405 is shown. It can be seen that in this example the content 405 comprises 23 bytes in total, and comprises a 3-byte Application ID 415. The content 405 comprises two bytes 420, 425 associated with cryptographic keys of the application. Byte 420 indicates preconditions for changing the key, and byte 425 indicates the number of keys to be stored, file IDs associated with the keys, and the cryptographic method to be used. The content 405 comprises a 2-byte ISO File ID 430 and an ISO dedicated file name 435 of up to 16 bytes. For example, where the contactless application is a DESFire application that supports ISO emulation instructions, a file associated with the application may be addressable by either the ISO File ID or by the ISO dedicated file name. In some embodiments, for example where the contactless application is a DESFire application that does not support ISO emulation instructions, the ISO File ID 430 and ISO dedicated file name 435 fields may not be supported. The contactless application may instead support for example native DESFire or wrapped commands. In such embodiments, these fields may be omitted from the content 405, permitting a compression of the instruction size from 23 bytes to 5 bytes.

Figure 5A:
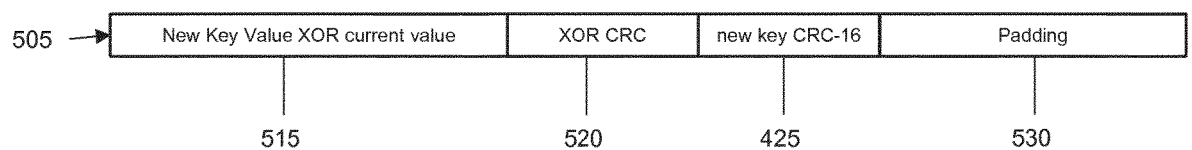
FIGS. 5A and 5B show schematic representations of content of example computer instructions to initialise or change keys associated with a contactless application.
Figure 5B:
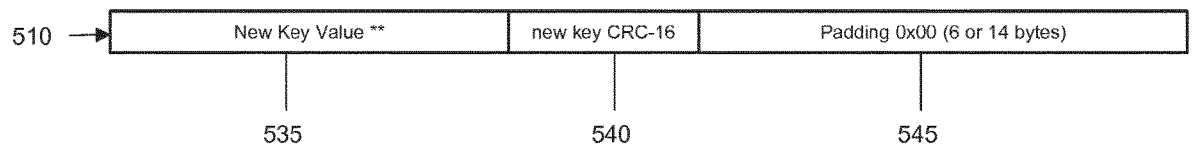

FIGS. 5A and 5B show schematic representations of content 505, 510 of computer instructions 125 to initialise or change keys associated with a contactless application according to examples. In some embodiments, a key is initialised to a series of zeroes when the application is created. The key is then changed to a desired value following an instruction with content such as that shown in FIGS. 5A and 5B.

FIG. 5A shows an example wherein the key to be changed is not equal to a key used to authenticate the present session. The content 505 of the instruction comprises a series of bits 515 equal to a binary XOR of the new key value with the current value. The content 505 comprises a cyclic redundancy check (CRC) 520 corresponding to the XOR 515 and a CRC 525 corresponding to the new key value. The CRCs allow error detection and may be calculated for example using a known CRC-16 algorithm. The content 505 of the instruction comprises padding bits 530, which may for example comprise a series of zeroes.

FIG. 5B shows an example wherein the key to be changed is equal to a key used to authenticate the present session. The content 510 of the instruction comprises the new key value 535 and a CRC 540 corresponding to the new key value 535. The content 510 comprises padding bits 545 which may comprise a series of zeroes.

The examples shown in FIGS. 5A and 5B thus require knowledge of the current value of the key to be demonstrated before the key can be changed, either by providing an XOR of the current value with the new value in the example of FIG. 5A, or by using the current value of the key to authenticate the session in the example of FIG. 5B.

Figure 6:
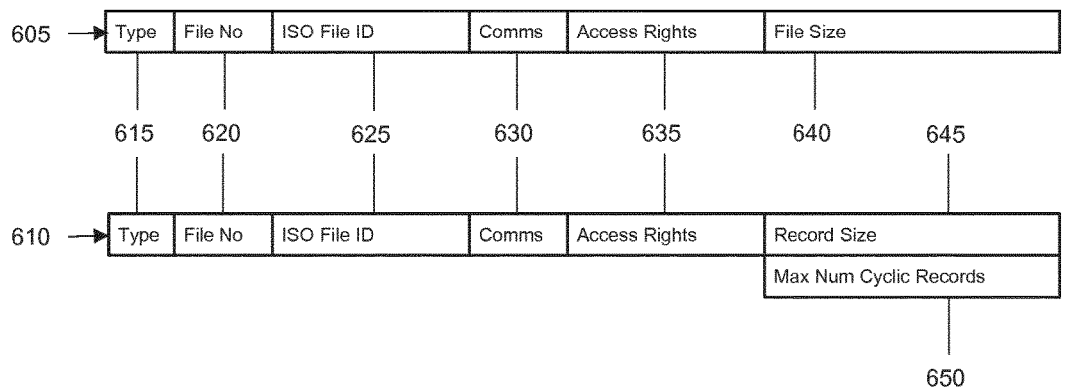
FIG. 6 shows a schematic example of content of computer instructions to create files of different types associated with a contactless application.

FIG. 6 shows a schematic example of content 605, 610 of content of computer instructions to create files of different types associated with a contactless application according to examples. Content 605 is an example for creating a file with a file type of "standard" for example associated with a DESFire application, and content 610 is an example for creating a file with a file type of "cyclic", for example associated with the same DESFire application. Contents 605, 610 comprise an indication 615 of the file type of the file to be created.

The contents, 605, 610 may each comprise a File Number 620 and an ISO file ID 625 as described above. The contents 605, 610 each comprise a communication type 630 as described above in relation to FIG. 3. The contents 605, 610 each comprise an indication 635 of access rights as described above in relation to FIG. 3.

Content 605, relating to a file of "standard" file type, comprises an indication 640 of file size, expressed for example in bytes. Content 610, relating to a file of "cyclic" file type, comprises an indication 645 of record size and an indication 650 of a maximum number of cyclic records associated with the file.

In some embodiments, one or more fields 615-650 described above may not be required to create a file associated with a contactless application. For example, an ISO File ID 625 is not required to create a file associated with a DESFire application. In such an embodiment, the non-required field or fields may be omitted from the instructions 125. As another example, the file size 640 may be expressed as a number of blocks of bytes of predefined size, for example a number of 32-byte blocks. In this example, the size of the file size field 640 is reduced compared with embodiments in which the file size is expressed as a number of bytes. In this example, the contactless application supports only file sizes of integer multiples of 32 bytes. The instructions 125 can thus be commensurately smaller, effectively providing compression of the instructions 125.

Figure 7:
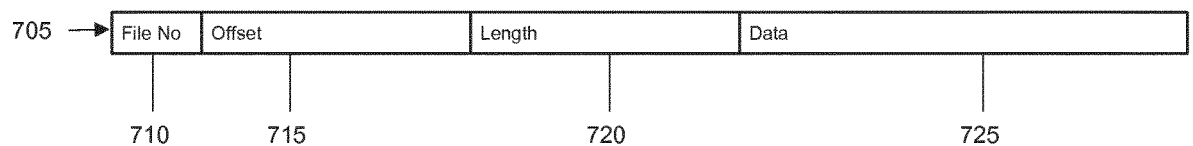
FIG. 7 is a schematic representation of content of an instruction to, following creation of a file associated with a contactless application, initialise data associated with that file.

FIG. 7 is a schematic representation of content 705 of an instruction to, following creation of a file associated with a contactless application, initialise data associated with that file. Content 705 comprises a file number 710, associated with the file, to identify the file. Content 705 comprises an offset 715 indicating an offset within the file at which data should be written. For example, a non-zero offset would indicate that data should not be written at the start of the file, but at a point indicated by the offset. Content 705 comprises a length 720 of data to be written to the file. Content 705 comprises the data 725 to be written to the file.

In embodiments, one or more of fields 710-725 may be compressed, allowing corresponding compression of the instructions 125. For example, it may be desirable for many files to be initialised to a sequence of the same binary value, such as a sequence of zeroes. In such an example, the data 725 to be written may be compressed using a known run-length encoding algorithm. This enables a corresponding compression of the instructions 125.

Figure 8:
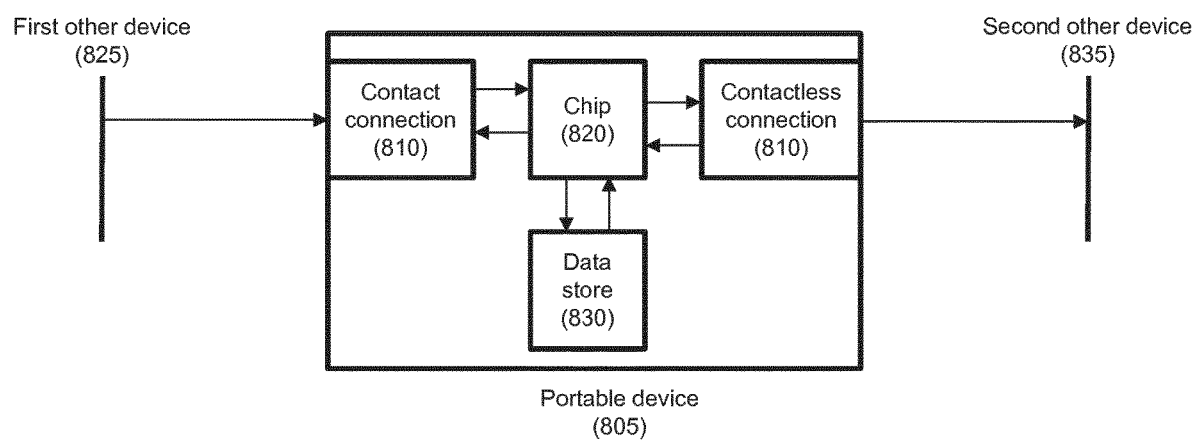
FIG. 8 is a schematic representation of a portable device 805 according to an embodiment.

FIG. 8 is a schematic representation of a portable device 805 according to an embodiment. The portable device may for example be a payment card or other smart card, or a mobile telecommunication device. The portable device 805 comprises input/output means arranged to communicate with other devices via a contact connection 810 and via a contactless connection 815.

The portable device 805 comprises a chip 820. The chip is arranged to receive, from a first other device 825 and via physical contact between the first other device 825 and the portable device 805, a set of computer instructions to be executed by the chip 820. The set of instructions comprises instructions to create a contactless application in a data store 830 of the chip 805, and to initialise at least one file associated with the contactless application. In some embodiments, the contactless application is a contactless payment application.

The chip 805 is arranged to configure the contactless application in accordance with a set of computer instructions and to execute the contactless application, whereby to transmit data to a second other device 835 via contactless communication between the portable device 805 and a contactless reader of the second other device 835.

As mentioned above, in some examples the portable device 805 comprises a smart card. In such examples, the physical contact between the portable device 805 and the first other device 825 comprises a connection between a card reader of the first other device 825 and at least one contact pad of the smart card 805.

The above embodiments are to be understood as illustrative examples of the invention. Further embodiments of the invention are envisaged. For example, the contactless application may comprise a token for unlocking hotel room doors and/or accessing facilities at a hotel, all-inclusive resort or campus. The contactless application may comprise event tickets or otherwise provide access to event venues. The contactless application may comprise a token for allowing keyless access to a vehicle such as a car, for example a rental car. The contactless application may comprise a value indicating a number of loyalty points accrued by a user, for example at a particular shop. The contactless application may comprise a token and/or biometric data for providing authentication of the user's identity. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for configuring a contactless application on a chip within a portable device, the portable device comprising input/output means arranged to communicate with other devices via a contact connection and via a contactless connection, the method comprising a first process and a second process, wherein:
   the first process comprises:
      receiving, at the chip and from a first other device, a set of computer instructions, to be executed by the chip, to:
         create a contactless application in a data store of the chip; and
         initialise at least one file associated with the contactless application,
      configuring the contactless application in accordance with the set of computer instructions, and
   the second process comprises:
      executing, by the chip of the portable device, the contactless application, whereby to transmit data to a second other device,
   wherein the first process is conducted via physical contact between the first other device and the portable device and the second process is conducted via contactless communication between the portable device and a contactless reader of the second other device.

2. A method according to claim 1, comprising activating the contactless application in response to a command received at the chip from a third other device.

3. A method according to claim 2, comprising receiving the command via physical contact between the third other device and the portable device.

4. A method according to claim 1, wherein the first process comprises:
  receiving the computer instructions as compressed data; and
  decompressing the compressed data to obtain the set of computer instructions.

5. A method according to claim 1, wherein the set of computer instructions comprises instructions to initialise at least one cryptographic key associated with the application.

6. A method according to claim 1, wherein the computer instructions to initialise at least one file comprise computer instructions to:
  create a file structure comprising the at least one file; and
  store within the file structure data associated with the at least one file.

7. A portable device comprising:
  input/output means arranged to communicate with other devices via a contact connection and via a contactless connection;
  a chip arranged to:
    receive, from a first other device and via physical contact between the first other device and the portable device, a set of computer instructions, to be executed by the chip, to:
      create a contactless application in a data store of the chip; and
      initialise at least one file associated with the contactless application,
    configure the contactless application in accordance with the set of computer instructions;
    execute the contactless application, whereby to transmit data to a second other device via contactless communication between the portable device and a contactless reader of the second other device.

8. A portable device according to claim 7, wherein the portable device is a payment card.

9. A portable device according to claim 7, wherein the contactless application is a contactless payment application.

10. A portable device according to claim 7, wherein:
  the portable device comprises a smart card; and
  the physical contact between the portable device and the first other device comprises a connection between a card reader of the first other device and at least one contact pad of the smart card.

11. The method of claim 1, wherein the first other device is an ATM or a POS terminal.

* * * * *